United States Patent [19]

Jacob-Grinschgl et al.

[11] Patent Number: 4,639,547
[45] Date of Patent: Jan. 27, 1987

[54] MARKING DEVICE FOR USE WITH INDUCTIVE MEASURING SENSOR

[76] Inventors: Wolfgang Jacob-Grinschgl, 40 Rumfordstrasse, D-8000 Munich; Udo Müller, 20 b Furtweg, D-8044 Unterschleissheim, both of Fed. Rep. of Germany

[21] Appl. No.: 783,292

[22] Filed: Oct. 2, 1985

[30] Foreign Application Priority Data

Oct. 5, 1984 [DE] Fed. Rep. of Germany ....... 3436641

[51] Int. Cl.$^4$ ............................................. G08C 21/00
[52] U.S. Cl. ....................................... 178/18; 178/19; 33/18.1; 33/1 M
[58] Field of Search .............................. 178/18, 19, 20; 219/201, 200, 216; 33/18.1, 189, 1 M; 340/825.36, 710

[56] References Cited

U.S. PATENT DOCUMENTS

| 4,194,084 | 3/1980 | Hetzel | 178/19 |
| 4,210,775 | 7/1980 | Rodgers et al. | 178/19 |

Primary Examiner—Stafford D. Schreyer
Attorney, Agent, or Firm—Jon S. Saxe; Bernard S. Leon; George W. Johnston

[57] ABSTRACT

A marking device for marking a sheet mounted on a digitizer board includes a measuring coil inductively coupled to the digitizer board when the coil is operatively positioned relative to the board. A switch on the marking device is operable to cause current pulses to be applied to the conductors on the digitizer board producing magnetic flux which couples the conductors on the board to the coil. A marker on the marking device is responsive to operation of the switch for marking a thermosensitive sheet on which the measuring coil is placed thereby marking on the sheet the position of the marking device when the switch was closed.

11 Claims, 4 Drawing Figures

MARKING DEVICE FOR USE WITH INDUCTIVE MEASURING SENSOR

TECHNICAL FIELD

This invention relates to a marking device for an inductive measuring sensor used with a digitizer board.

BACKGROUND ART

A digitizer board comprises a substrate carrying two groups of orthogonally disposed grid wires, each group comprising a plurality of spaced, parallel conductors. A selectively operable control circuit causes identical current pulses to flow in predetermined sequence and direction through the conductors of a group of grid wires for locating a measuring sensor positioned in inductive relationship with the digitizer board. The grid wires produce magnetic flux lines that are coupled to a coil in the measuring sensor. The resultant induced voltage in the coil is processed and provides the position of the coil relative to the board.

One important application of digitizers of the type described is to obtain the digital coordinates of individual points defining a two dimensional profile lying on the digitizer board. Proper utilization of the coordinates requires that no point on the profile should be digitized twice, and that no point on the profile should be omitted by oversight.

Conventionally, an operator places a sheet on which the profile is drawn over the digitizer board, and then positions the sensor at a selected point on the profile. By operating the control circuit, the operator is supplied with the coordinates of the point. To keep track of the process, the operator places a mark, with a pencil, for example, on the sheet at the selected point. This makes the procedure for obtaining the coordinates of the profile more difficult and time consuming than is desired; and a relatively large number of mistakes are likely to result.

An object of the invention, therefore, is to provide a new and improved marking device of the type described which facilitates marking selected points on a profile located on a digitizer board.

DISCLOSURE OF INVENTION

According to the present invention, a marking device for marking a sheet mounted on a digitizer board comprises a measuring coil having a torroidal winding for receiving flux produced by conductors located on the board when the coil is operatively positioned relative to the board. A switch provided on the marking device is operable to cause current pulses to be applied to the conductors on the board. The marking device further includes marking means responsive to the operation of the switch for marking the sheet when the coil is operatively positioned relative to the board. Thus, the act of obtaining the coordinates of the sensor coil simultaneously marks the location of the sensor on the sheet. Preferably, the marking means includes a heatable zone that is heated in response to the operation of the switch. In such case, the sheet to be marked is thermosensitive paper.

In one embodiment of the invention, a transparent member is mounted on the coil and the heatable zone is on a surface of the transparent member facing the sheet. This permits the operator to place the coil in contact with the sheet on the digitizer board, and to mark the position of the coil on the sheet by operating the switch. In this embodiment, the transparent member may include crosshairs whose crossing point is located at the center of the coil; and in such case, the crosshairs may be in the form of conductive coatings applied to the transparent member. The crosshairs may have a reduced cross section at the crossing point in order to establish a resistance value which is heated, when the switch is closed, to a temperature that effects marking of the sheet.

In an alternative embodiment, the heating zone may comprise an electrical resistance wire which has a pointed end that is disposed centrally in the coil.

BRIEF DESCRIPTION TO DRAWING

Embodiments of the invention are disclosed in the accompanying drawings wherein.

DETAILED DESCRIPTION

Figure 1:
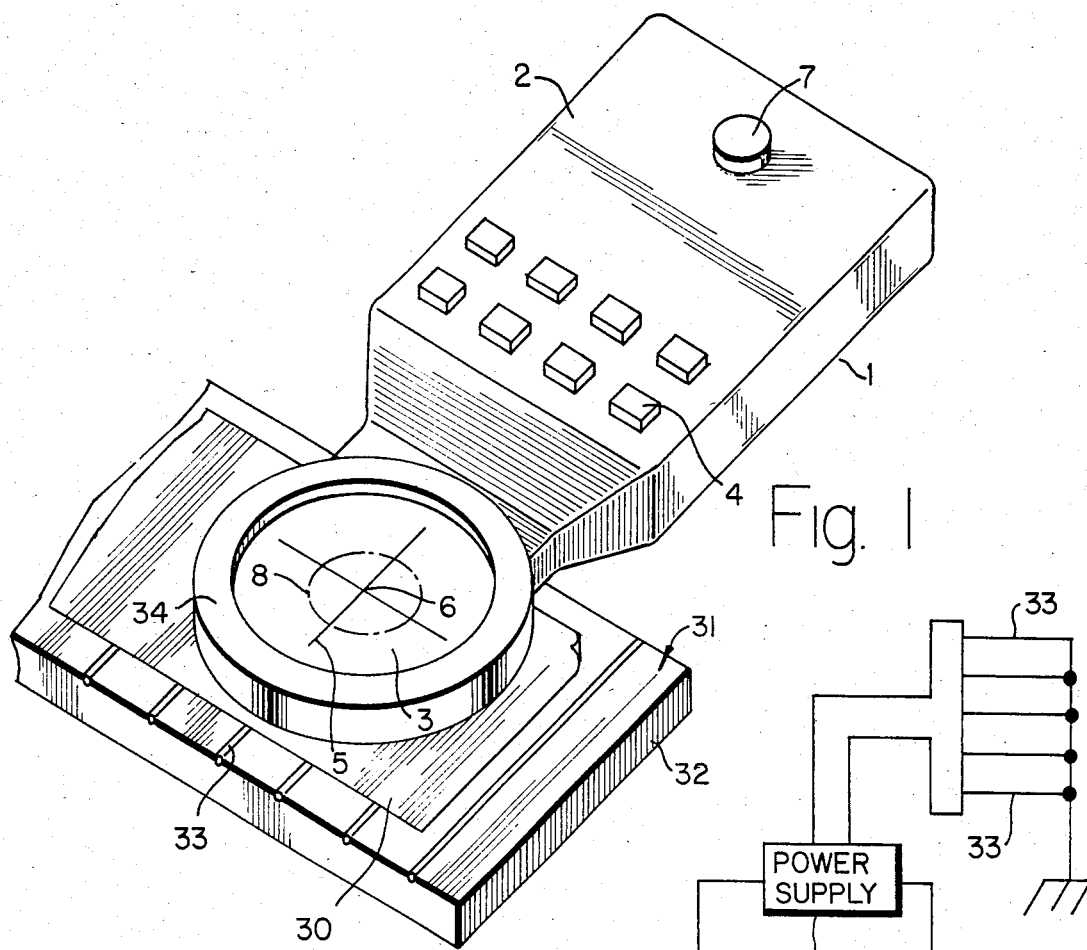
FIG. 1 is a perspective view of one embodiment of the present invention.

Referring now to FIG. 1, measuring sensor 1 according to the present invention is shown in combination with sheet 30 mounted on digitizer board 31 which comprises substrate 32 on one surface of which are mounted a plurality of spaced, parallel conductors 33 over which sheet 30 is placed. Sensor 1 includes casing 2 having a torroidal winding (not shown) contained in ring-like member 34 at one end of the casing. Conductors 33 are connected to power supply 35 which, when switch 7 is closed, supplies identical current pulses in timed sequence to conductors 33. The sequential flow of current through these conductors creates magnetic flux lines which pass through member 34 inducing voltages in the winding contained in member 34. The induced voltage is processed by components contained within casing 2 to produce, and optionally, display or record, the coordinates of the sensor relative to the digitizer board. The processing operation is well known; and for this reason is not further detailed in the present application. Finally, push buttons 4 located on casing 2 maybe used to initiate operations for processing and utilizing the coordinates so computed.

In order to more precisely indicate the position of the winding on the digitizer board when the coordinates are calculated, the winding is provided with transparent member 3, such as a glass or plastic disk, mounted within the torroidal winding. The glass bears crosshairs 5 having crossing point 6 which establishes the electrical center point of coil 34.

Figure 2:
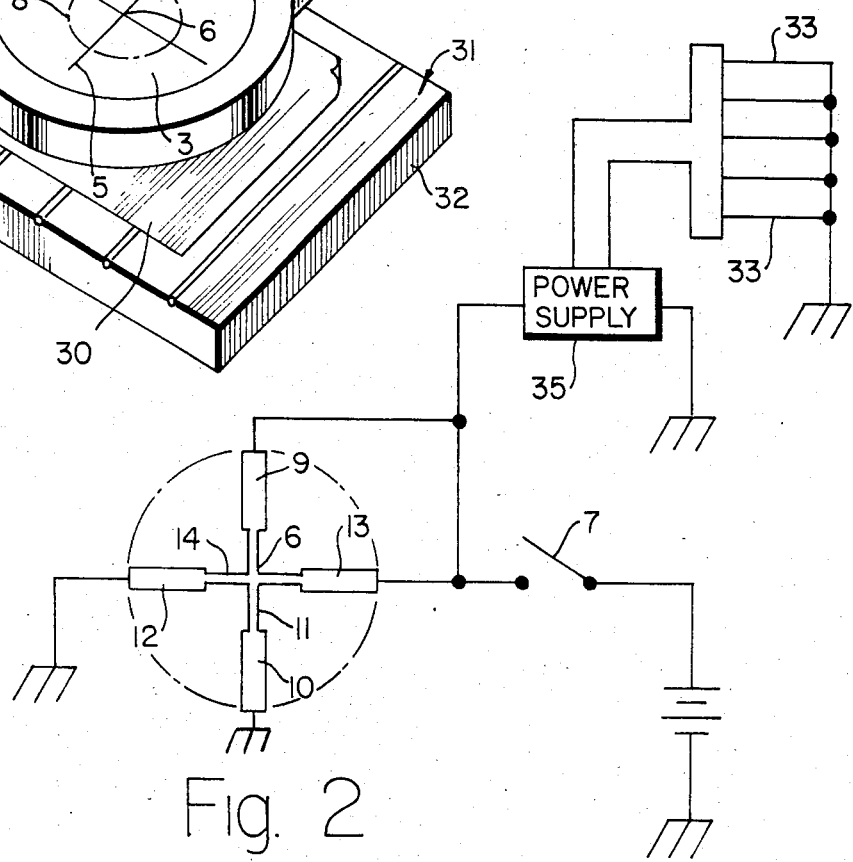
FIG. 2 is an enlargement, in plan, of the zone in the center of the coil included within the broken lines in FIG. 1.

An enlargement of the region on disk 3 contained within circle 8 of FIG. 1 is shown in FIG. 2. Specifically, crosshairs 5 are in the form of a relatively wide conductor 9, 10 connected by narrow portion 11, and an orthogonally positioned, relatively wide conductor 12, 13 connected by narrow portion 14. The crossing of portions 11 and 14 define center point 6.

Preferably, the conductors are in the form of a metal film applied to the glass, for example, by a vapor deposition process, sputtering, or other conventional technique. Because of their reduced cross sectional area, conductor portions 11 and 14 define a relatively high resistance path. That is to say, the resistance per unit length of portions 11 and 14 is much larger than the corresponding resistance per unit length in either conductor 9, 10, or conductor 12, and 13. Preferably, the width of conductor portions 11 and 14 is very small in order to provide accurate markings as described below.

Casing 2 of the marking device contains battery 36 which, when switch 7 is closed, supplies current to conductors 9–14. Thus, the closure of switch 7 is effective to supply power both to conductors 9–14, as well as to power supply 25 of digitizer board 31. Thus, switch 7 is operable to cause current pulses to be applied to conductors 33 on the digitizer board as well as to cause heating of portions 11, 14 of conductors 9–14 which are in contact with thermosensitive paper 30. As a consequence, operation of switch 7 simultaneously marks the position of the sensor on paper 30, and obtains the coordinates thereof.

Figure 3:
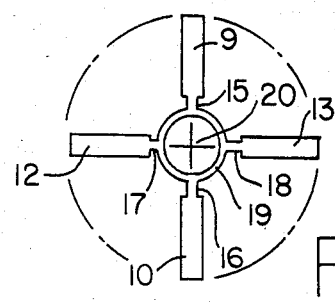
FIG. 3 is a second embodiment of the zone shown in broken lines in FIG. 1.

Instead of using crosshairs as shown in FIG. 2, other geometric configurations can be utilized for marking the center point of coil 34. An example is shown in FIG. 3 where the heatable zone is in the form of narrow circular resistance ring 19 connected to relatively wide conductors 9', 10', 12', 13' by reduced portions 17, 18. In this case, the surface of transparent member 3 maybe scored at 20 to form crosshairs to assist in positioning the sensor at a selected point on sheet 30 prior to obtaining the coordinates of the selected point. Furthermore, the embodiment shown in FIG. 3 has the advantage that the plotted point is not itself marked, but only its surroundings.

Figure 4:
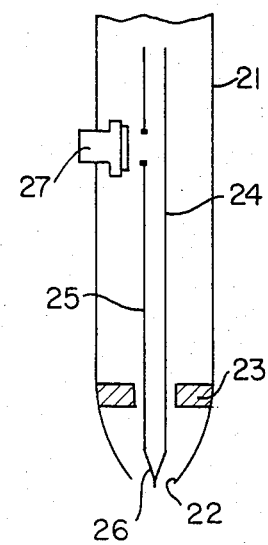
FIG. 4 is a second embodiment of the invention.

A second embodiment of the invention is shown in FIG. 4 wherein the marking device is in the form of a stylus. Specifically, the marking device includes tubular housing 21 corresponding roughly to the configuration of a ball point pen, the bottom end of which is tapered and formed with small aperture 22. Located immediately above the aperture inside the casing is a torroidal coil 23 which is inductively coupled to the conductors on the digitizer board.

Protruding downwardly through aperture 22 is a resistance wire bent at an acute angle into V-shaped point 26. Housing 21 can be positioned so that point 26 may be placed in direct contact with sheet 30 on the digitizer board. Leads 24 and 25 connect point 26 to a power supply (not shown) by means of push button switch 27. The closure of this switch permits power to be applied to the resistance wire heating point 26 and thereby marking the thermosensitive paper at the spot with which the point is in contact. As indicated previously, push button 27 is also used to initiate a measuring cycle by supplying current to grid wires 33 on the digitizer board.

We claim:

1. A marking device for marking a sheet mounted on a digitizer board of the type having a plurality of spaced, parallel conductors to which the application of current pulses in timed sequence produces a time variable magnetic flux, said marking device comprising:
    a. a measuring coil having torroidal winding for receiving flux produced by said board when said coil is operatively positioned relative to said board;
    b. switch means operable to cause said current pulses to be applied to said conductors on said board; and
    c. marking means responsive to operation of said switch means for marking said sheet when said coil is operatively positioned relative to said board.

2. A marking device according to claim 1 wherein said marking means includes a heatable zone that is heated in response to operation of said switch means.

3. A marking device according to claim 2 in combination with a heat sensitive sheet in operative relation to said marking device such that heating of said heatable zone causes indicia to appear on the heat sensitive sheet.

4. A marking device according to claim 2 wherein said heatable zone is centrally located on the axis of said coil.

5. A marking device according to claim 4 including a transparent member mounted in said coil, said heatable zone being on one surface of said transparent member.

6. A marking member according to claim 5 wherein said transparent member includes crosshairs at the center thereof.

7. A marking device according to claim 6 wherein said heatable zone is in the form of a conductive coating on one surface of said transparent member.

8. A marking device according to claim 7 wherein said crosshairs are defined by portions of reduced cross sectional area at the crossing point thereof.

9. A marking device according to claim 8 wherein said reduced cross section constitutes a resistance coating which is heated by the passage of electrical current.

10. A marking device according to claim 4 wherein said heatable zone comprises an electrical resistance wire.

11. A marking device according to claim 10 wherein said marking means is in the form of a wire having a pointed end axially located centrally in said winding.

* * * * *